(12) United States Patent
Tano et al.

(10) Patent No.: US 11,214,151 B2
(45) Date of Patent: Jan. 4, 2022

(54) VOLTAGE CONTROL SYSTEM WITH ADDITION TERM AND FUEL CELL SYSTEM

(71) Applicant: TOYOTA JIDOSHA KABUSHIKI KAISHA, Toyota (JP)

(72) Inventors: Yutaka Tano, Toyota (JP); Kenji Umayahara, Miyoshi (JP); Takahiro Umehara, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 15/622,379

(22) Filed: Jun. 14, 2017

(65) Prior Publication Data

US 2017/0365867 A1   Dec. 21, 2017

(30) Foreign Application Priority Data

Jun. 16, 2016 (JP) .............................. JP2016-120001

(51) Int. Cl.
*H02M 3/158* (2006.01)
*H02J 1/12* (2006.01)
(Continued)

(52) U.S. Cl.
CPC ............... *B60L 7/16* (2013.01); *B60L 3/0053* (2013.01); *B60L 58/40* (2019.02);
(Continued)

(58) Field of Classification Search
CPC ......... H01M 8/04873; H01M 8/04574; H01M 8/04; H01M 8/04865; B60L 58/40;
(Continued)

(56) References Cited

U.S. PATENT DOCUMENTS

2013/0258734 A1*  10/2013  Nakano ................. H02M 7/537
                                                          363/131
2014/0225430 A1*   8/2014  Oyobe ....................... B60L 7/14
                                                          307/9.1
(Continued)

FOREIGN PATENT DOCUMENTS

JP        2015-19448         1/2015
WO   WO 2016/185608    * 11/2016 .............. H01M 8/04

OTHER PUBLICATIONS

Y. Tano et al., "Voltage Control System, Fuel Cell System, and Control Method for Voltage Control System," U.S. Appl. No. 15/439,027, filed Feb. 22, 2017.

*Primary Examiner* — Kwang Han
(74) *Attorney, Agent, or Firm* — Finnegan, Henderson, Farabow, Garrett & Dunner, LLP

(57) ABSTRACT

A voltage control system includes: a converter controlling portion; a current value acquisition portion; and a voltage value acquisition portion. The converter controlling portion sets a duty ratio in a present cycle by adding an addition term to a feedforward term, the addition term being determined by use of a current deviation, which is a difference between a target value of an output current in the present cycle and a current measured value in a previous cycle, and the duty ratio in the previous cycle, the addition term being corresponding to an increase of the output current in the present cycle.

12 Claims, 7 Drawing Sheets

(51) Int. Cl.

| | | |
|---|---|---|
| *H01M 8/04537* | (2016.01) | |
| *H01M 8/04858* | (2016.01) | |
| *H02M 3/155* | (2006.01) | |
| *B60L 7/16* | (2006.01) | |
| *B60L 3/00* | (2019.01) | |
| *H02J 7/34* | (2006.01) | |
| *B60L 58/40* | (2019.01) | |
| *H02J 7/00* | (2006.01) | |

(52) U.S. Cl.
CPC ... *H01M 8/04574* (2013.01); *H01M 8/04873* (2013.01); *H02J 1/12* (2013.01); *H02J 7/007* (2013.01); *H02J 7/0063* (2013.01); *H02J 7/34* (2013.01); *H02M 3/155* (2013.01); *H02M 3/158* (2013.01); *H02M 3/1584* (2013.01); *B60L 2210/14* (2013.01); *H02J 2300/30* (2020.01)

(58) Field of Classification Search
CPC ...... B60L 7/16; B60L 3/0053; B60L 2210/14; B60L 58/30; B60L 53/20; B60L 2240/443; H02J 7/34; H02J 1/12; H02J 7/0063; H02J 2001/004; H02J 2007/0067; H02J 7/007; H02J 2300/30; H02J 2310/48; H02M 3/1584; H02M 3/158; H02M 3/155; H02M 3/156; Y02E 60/50; Y02T 90/14; Y02T 10/7072; Y02T 10/92; Y02T 10/70; Y02T 10/72; Y02T 90/40
See application file for complete search history.

(56) References Cited

U.S. PATENT DOCUMENTS

| | | | |
|---|---|---|---|
| 2018/0054151 A1* | 2/2018 | Matsumoto | H01M 8/04589 |
| 2018/0123152 A1* | 5/2018 | Matsumoto | B60L 58/40 |
| 2018/0287490 A1* | 10/2018 | Yuasa | H02M 1/4216 |

* cited by examiner

VOLTAGE CONTROL SYSTEM WITH ADDITION TERM AND FUEL CELL SYSTEM

INCORPORATION BY REFERENCE

The disclosure of Japanese Patent Application No. 2016-120001 filed on Jun. 16, 2016 including the specification, drawings and abstract is incorporated herein by reference in its entirety.

BACKGROUND

1. Technical Field

The present disclosure relates to a voltage control system, a fuel cell system, and a control method for a voltage control system.

2. Description of Related Art

In a fuel cell system, it is desirable that, regardless of an operating state of a fuel cell, necessary electric power be supplied to an external load, accessories, and the like quickly and stably. On this account, a voltage control system that increases an output voltage of the fuel cell by use of a converter is incorporated in the fuel cell system in general (e.g., Japanese Patent Application Publication No. 2015-19448 (JP 2015-19448 A)).

The converter is constituted by a reactor, which is an inductance element, and a switching element that controls a current flow to the reactor. A boost operation of the converter is controlled by a duty ratio indicative of a ratio of an opening/closing period of the switching element in one cycle. The duty ratio is generally subjected to a feedback control so that a deviation between an output voltage or an output current of the converter and its target value is reduced.

SUMMARY

In terms of a control on the converter, in a case where a target electric power changes remarkably in a short time, for example, delay, overshoot, or the like of the feedback control might be caused, which might impair the followability of an output power with respect to the target electric power. Such a problem about the controllability of the converter is not limited to the fuel cell system, but is common to a general voltage control system that increases an input voltage by use of a converter.

The present disclosure has been accomplished in order to solve at least some of the above problems, and can be realized in the following aspects.

A first aspect of the present disclosure relates to a voltage control system that increases an input voltage. The voltage control system of this aspect includes a converter device, a converter controlling portion, a current value acquisition portion, and a voltage value acquisition portion. The converter device includes a reactor and is configured to perform accumulation and release of electrical energy with respect to the reactor in one cycle and to operate by use of a duty ratio determined as a ratio of an accumulation period during which the energy is input and accumulated into the reactor in the one cycle. The converter controlling portion is configured to set the duty ratio and control an output voltage of the converter device. The current value acquisition portion is configured to acquire a current measured value, which is a measured value of an output current found as an average, relative to a time, of a current value output from the reactor in the one cycle. The voltage value acquisition portion is configured to acquire an input side voltage value indicative of an input voltage of the converter device and an output side voltage value indicative of an output voltage of the converter device. The converter controlling portion sets the duty ratio in a present cycle by use of a feedforward term and an addition term. The feedforward term is derived by use of the input side voltage value and the output side voltage value acquired at a beginning of the present cycle. The addition term is determined by reflecting a current deviation, which is a difference between a target value of the output current and the current measured value in the previous cycle, and the duty ratio in the previous cycle, and the addition term is added to the feedforward term and corresponds to an increase of the output current in the present cycle. With the voltage control system of this aspect, due to the addition term determined by use of the current deviation and the duty ratio in the previous cycle, it is possible to obtain an increase of the output current so as to reduce the current deviation more in the present cycle. Accordingly, even in a case where a current target value greatly changes during the previous cycle, it is possible to restrain an occurrence of a response delay of the converter device with respect to the change of the current target value, thereby making it possible to increase the controllability of the converter device.

In the voltage control system of the above aspect, the addition term may take a value corresponding to an increasing amount of the duty ratio, the increasing amount being able to increase the current measured value obtained in the previous cycle only by an amount corresponding to the current deviation if the addition term is added to the duty ratio in the previous cycle. With the voltage control system of this aspect, since the addition term provided based on the control in the previous cycle, the current deviation caused at the beginning of the present cycle can be reduced more during the present cycle.

In the voltage control system of the above aspect, the converter controlling portion may derive the addition term by use of the current deviation and at least one of the target value of the output current in the present cycle, the current measured value in the previous cycle, the duty ratio in the previous cycle, and the input side voltage value in the present cycle. With the voltage control system of this aspect, the addition term can be found by use of given parameters at the beginning of the present cycle.

In the voltage control system of the above aspect, when the addition term is indicated by $\Delta D$, the input side voltage value is indicated by $V_L$, the output side voltage value is indicated by $V_H$, the duty ratio in the previous cycle is indicated by $Dp$, the current deviation is indicated by $\Delta I$, the current measured value in the previous cycle is indicated by $I$, and a minimum value of the current value output from the converter device in the previous cycle is indicated by $I_0$. $\Delta D$ may be expressed by Expression (1).

$$\Delta D = \frac{V_L}{V_H}\left(1 - \sqrt{1 - \frac{V_H}{V_L} \cdot Dp \cdot \frac{\Delta I}{I - I_0}}\right) \quad (1)$$

With the voltage control system of this aspect, it is possible to derive the addition term more appropriately.

In the voltage control system of the above aspect, when the addition term is indicated by $\Delta D$, the input side voltage value is indicated by $V_L$, the output side voltage value is indicated by $V_H$, an inductance of the reactor is indicated by $V_L$, a period of the one cycle is indicated by T, and the current deviation is indicated by $\Delta I$, $\Delta D$ may be expressed by Expression (2).

$$\Delta D = \frac{V_L}{V_H} \cdot \left(1 - \sqrt{1 - 2 \cdot \frac{V_H \cdot L}{V_L^2 \cdot T} \cdot \Delta I}\right) \quad (2)$$

With the voltage control system of this aspect, the addition term can be found by use of a fewer parameters.

In the voltage control system of the above aspect, when the addition term is indicated by $\Delta D$, the input side voltage value is indicated by $V_L$, an inductance of the reactor is indicated by L, and the current deviation is indicated by $\Delta I$, $\Delta D$ may be expressed by Expression (3).

$$\Delta D = \frac{L}{V_L \cdot T} \cdot \Delta I \quad (3)$$

With the voltage control system of this aspect, it is possible to easily derive the addition term only by use of the input side voltage value and the current deviation among the parameters that vary depending on cycles.

In the voltage control system of the above aspect, when the addition term is indicated by $\Delta D$, the duty ratio in the previous cycle is indicated by Dp, the current deviation is indicated by $\Delta I$, the current measured value in the previous cycle is indicated by I, and a minimum value of the current value output from the converter device in the previous cycle is indicated by $I_0$, $\Delta D$ may be expressed by Expression (4).

$$\Delta D = \frac{1}{2} \cdot Dp \cdot \frac{\Delta I}{I - I_0} \quad (4)$$

With the voltage control system of this aspect, the addition term can be found by a simpler expression.

In the voltage control system of the above aspect, when the current deviation is a predetermined threshold or more, the converter controlling portion may use the duty ratio derived by use of the addition term, and when the current deviation is less than the threshold, the converter controlling portion may use another duty ratio derived without using the addition term. With the voltage control system of this aspect, the duty ratio to be set by use of the addition term or another duty ratio to be set without the use of the addition term is selected appropriately to be used depending on the size of the current deviation. Accordingly, the followability of the voltage control system to the change of the current target value is increased more.

In the voltage control system of the above aspect, the converter controlling portion may set the another duty ratio by use of at least the feedforward term, and a feedback term to be added to the feedforward term and changing relative to the change of the current deviation more moderately than the addition term. With the voltage control system of this aspect, when the current deviation is small, the control is performed so that an actual output current comes closer to the current target value by the feedback term while the cycle is repeated. This accordingly makes it possible to more precisely control the duty ratio of the converter device, so that the controllability of the converter device is increased more.

In the voltage control system of the above aspect, the converter controlling portion may set the duty ratio in the present cycle by use of the feedforward term, the addition term, and a feedback term, the feedback term being a component to eliminate the current deviation differently from the addition term.

A second aspect of the present disclosure relates to a fuel cell system. The fuel cell system of this aspect includes a fuel cell and a voltage control system of any of the above aspects, and the voltage control system is configured to increase a voltage output from the fuel cell as the input voltage. With the fuel cell system of this aspect, it is possible to increase the controllability of the output voltage of the fuel cell.

A third aspect of the present disclosure relates to a control method for a voltage control system that increases an input voltage by use of a converter device including a reactor and configured to perform accumulation and release of electrical energy with respect to the reactor in one cycle, the converter device being configured to operate by use of a duty ratio determined as a ratio of an accumulation period during which the energy is input and accumulated into the reactor in the one cycle. The control method of this aspect includes: acquiring a current measured value, which is a measured value of an output current found as an average, relative to a time, of a current value output from the reactor in the one cycle; acquiring an input side voltage value indicative of an input voltage of the converter device and an output side voltage value indicative of an output voltage of the converter device at a beginning of a present cycle; and setting the duty ratio by use of the current measured value, the input side voltage value, and the output side voltage value so as to control the output voltage of the converter device. In the third aspect of the present disclosure, at a time of controlling the output voltage of the converter device, the duty ratio in the present cycle is set by use of a feedforward term and an addition term, the feedforward term being derived by use of the input side voltage value and the output side voltage value, the addition term being determined by use of a current deviation, which is a difference between a target value of the output current and the current measured value in a previous cycle, and the duty ratio in the previous cycle, the addition term being added to the feedforward term, the addition term being corresponding to an increase of the output current in the present cycle. With the control method of this aspect, even in a case where a current target value greatly changes during the previous cycle, it is possible to restrain an occurrence of a response delay of the converter device with respect to the change of the current target value.

Not all the plurality of constituents included in each aspect of the present disclosure is necessary, and in order to solve some or all of the abovementioned problems or in order to achieve some or all of the effects described herein, some of the plurality of constituents may be modified, deleted, or replaced with another new constituent as appropriate, and a limitative content may be partially deleted. Further, in order to solve some or all of the abovementioned problems or in order to achieve some or all of the effects described herein, some or all of the technical features included in one aspect of the present disclosure may be combined with some or all of the technical features included in another aspect of the present disclosure so as to form one independent aspect of the present disclosure.

The present disclosure is achievable in various aspects other than the voltage control system, the fuel cell system, and the control method for the voltage control system. For example, the present disclosure is achievable by a control method for the converter device, a voltage increase method, a computer program to cause a computer to have a function to realize those methods, or a recording medium which is not a temporal medium and which stores the computer program. In addition, the present disclosure is also achievable in the form of a vehicle equipped with the fuel cell system, control methods for the fuel cell system and the vehicle equipped therewith, and so on.

BRIEF DESCRIPTION OF THE DRAWINGS

Features, advantages, and technical and industrial significance of exemplary embodiments of will be described below with reference to the accompanying drawings, in which like numerals denote like elements, and wherein.

DETAILED DESCRIPTION OF EMBODIMENTS

A. Embodiments

Figure 1:
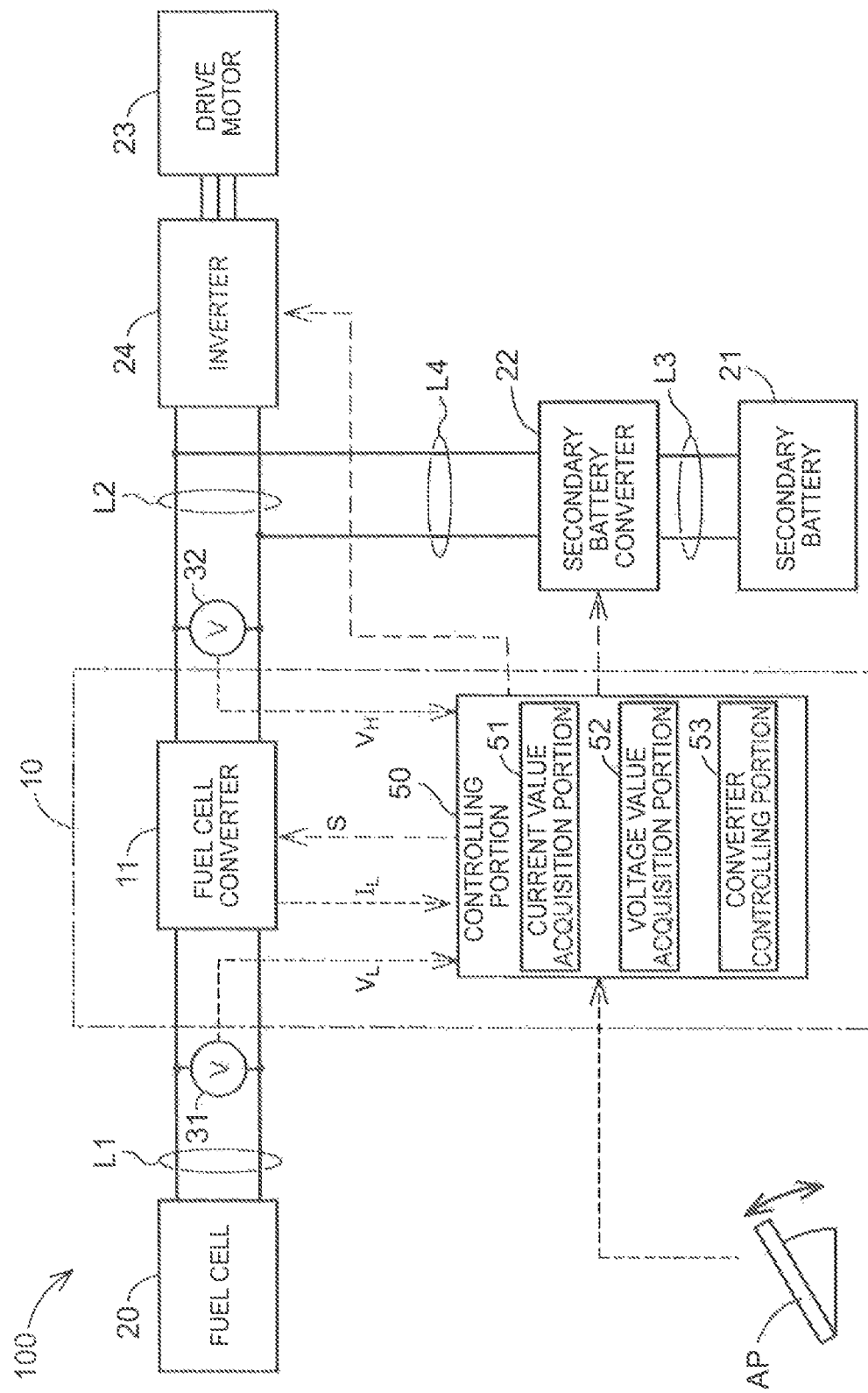
FIG. 1 is a schematic view illustrating an electrical configuration of a fuel cell system in which a voltage control system is incorporated.

FIG. 1 is a schematic view illustrating an electrical configuration of a fuel cell system 100 in which a voltage control system 10 is incorporated, as one embodiment of the disclosure. The fuel cell system 100 is provided in a fuel cell vehicle. The fuel cell system 100 causes a drive motor 23 to generate a driving force for the fuel cell vehicle by use of electric power generated by a fuel cell 20 in response to a driver's request received via an accelerator pedal AP or a request generated internally by an automatic control or the like.

In addition to the fuel cell 20 and the drive motor 23, the fuel cell system 100 includes a fuel cell converter 11, a secondary battery 21, a secondary battery converter 22, an inverter 24, a first voltage measuring portion 31, a second voltage measuring portion 32, and a controlling portion 50. As will be described later, the controlling portion 50 demonstrates a function as a current value acquisition portion 51, a function as a voltage value acquisition portion 52, and a function as a converter controlling portion 53. In the fuel cell system 100, the voltage control system 10 configured to increase a voltage output from the fuel cell 20 as an input voltage is constituted by the fuel cell converter 11, the current value acquisition portion 51, the voltage value acquisition portion 52, and the converter controlling portion 53.

The fuel cell 20 is a solid polymer fuel cell configured to generate electric power upon receipt of hydrogen and oxygen as reactant gases. The fuel cell 20 is not limited to the solid polymer fuel cell, and various types of fuel cells can be employed as the fuel cell 20. For example, as the fuel cell 20, a solid oxide fuel cell may be employed instead of the solid polymer fuel cell. The fuel cell 20 is connected to an input terminal of the fuel cell converter 11 via a first direct current lead wire L1.

The fuel cell converter 11 is a boost-up converter device, and under control of the controlling portion 50, the fuel cell converter 11 performs a boost operation to increase an input voltage input from the fuel cell 20 to a target voltage. An output terminal of the fuel cell converter 11 is connected to a direct current terminal of the inverter 24 via a second direct current lead wire L2. A relay circuit may be provided between the fuel cell converter 11 and the inverter 24. The fuel cell converter 11 transmits a measured value $I_L$ of a reactor current (described later) to the controlling portion 50 via a signal wire. The fuel cell converter 11 may be constituted by use of an intelligent power module (IPM). Details of a configuration and an operation of the fuel cell converter 11 will be described later.

The secondary battery 21 is constituted by a lithium ion battery, for example, and functions as a power source of the fuel cell system 100 as well as the fuel cell 20. The secondary battery 21 is connected to an input terminal of the secondary battery converter 22 via a third direct current lead wire L3.

The secondary battery converter 22 is a boost-up converter device, and has a configuration similar to the fuel cell converter 11. An output terminal of the secondary battery converter 22 is connected to the second direct current lead wire L2 that connects the fuel cell converter 11 to the inverter 24, via a fourth direct current lead wire LA. Under the control of the controlling portion 50, the secondary battery converter 22 controls charge/discharge of the secondary battery 21 by adjusting a voltage in the second direct current lead wire L2, which is an input voltage of the inverter 24, in cooperation with the fuel cell converter 11. When output power from the fuel cell converter 11 is insufficient to its target output power, the secondary battery converter 22 causes the secondary battery 21 to perform discharging. In the meantime, when regenerative power is generated in the drive motor 23, the secondary battery converter 22 causes the secondary battery 21 to accumulate the regenerative power. Note that the secondary battery converter 22 may have a configuration different from the fuel cell converter 11.

As described above, the drive motor 23 is a power source that drives wheel assemblies of the fuel cell vehicle, and is constituted by a three-phase alternating current motor, for example. The drive motor 23 is connected to an alternating current terminal of the inverter 24 via an alternating current lead wire.

The inverter 24 is a DC/AC inverter, and in response to a command from the controlling portion 50, the inverter 24 converts, into electric power of a three phase alternating current, electric power supplied as a direct current from the fuel cell 20 and the secondary battery 21 via the second direct current lead wire L2, and supplies it to the drive motor 23. Further, the inverter 24 converts regenerative power generated in the drive motor 23 into direct-current power and outputs it to the second direct current lead wire L2. The inverter 24 may be constituted by IPM. The fuel cell system 100 may include a plurality of inverters 24 connected to the second direct current lead wire L2, and accessories (not shown) other than the drive motor 23 may be electrically connected to the second direct current lead wire L2 via respective inverters 24.

The first voltage measuring portion 31 is connected to the first direct current lead wire L1, and measures an input voltage to the fuel cell converter 11 so as to output a signal indicative of its measured value to the controlling portion 50. The second voltage measuring portion 32 is connected to the second direct current lead wire L2, and measures an output voltage of the fuel cell converter 11 so as to output a signal indicative of its measured value to the controlling portion 50. The first and second voltage measuring portions 31, 32 may be each constituted by a voltage sensor.

The controlling portion 50 is constituted by a microcomputer including a central processing unit, a main storage, and a nonvolatile storage portion, and functions as various function parts such that the central processing unit executes various programs and orders read by the main storage. The controlling portion 50 is connected to the fuel cell converter 11, the secondary battery converter 22, and the inverter 24 via signal wires. The controlling portion 50 controls output power from the fuel cell 20 and the secondary battery 21, and causes the drive motor 23 to generate a driving force corresponding to an output request from a driver or an output request generated internally due to an automatic control or the like.

In the present embodiment, the controlling portion 50 functions as a superior controlling portion that controls the whole fuel cell system 100 configured as described above and also functions as an inferior controlling portion that controls the voltage control system 10. The controlling portion 50 functions as the current value acquisition portion 51, the voltage value acquisition portion 52, and the converter controlling portion 53.

The current value acquisition portion 51 acquires a current measured value I, which is a measured value of an output current of the reactor included in the fuel cell converter 11, based on the measured value $I_L$ of the reactor current. Details of the reactor of the fuel cell converter 11 and the current measured value I will be described later.

The voltage value acquisition portion 52 acquires a measured value of the input voltage of the fuel cell converter 11, transmitted from the first voltage measuring portion 31, as an input side voltage value $V_L$ indicative of the input voltage of the fuel cell converter 11. Further, the voltage value acquisition portion 52 acquires a measured value of the output voltage of the fuel cell converter 11, transmitted from the second voltage measuring portion 32, as an output side voltage value $V_H$ indicative of the output voltage of the fuel cell converter 11.

The converter controlling portion 53 of the controlling portion 50 sets a duty ratio D to control the output voltage of the fuel cell converter 11. The duty ratio D is set so as to correspond to a present output request to the voltage control system 10. The converter controlling portion 53 outputs, to the fuel cell converter 11, a control signal S to instruct the fuel cell converter 11 to perform driving at the duty ratio D. Details of the duty ratio D and a control procedure of the voltage control system 10 by the controlling portion 50 will be described later.

Note that the controlling portion 50 may be a single unit constituted for the purpose of controlling the fuel cell system 100, or may be constituted as a part of a control unit having various control functions, such as a control unit that controls a whole fuel cell vehicle, for example. Further, the controlling portion 50 may be constituted by a plurality of circuits, units, modules, and the like individually implementing various functions. For example, the current value acquisition portion 51, the voltage value acquisition portion 52, and the converter controlling portion 53 may be constituted by individual circuits, individual units, individual modules, and the like.

Figure 2:
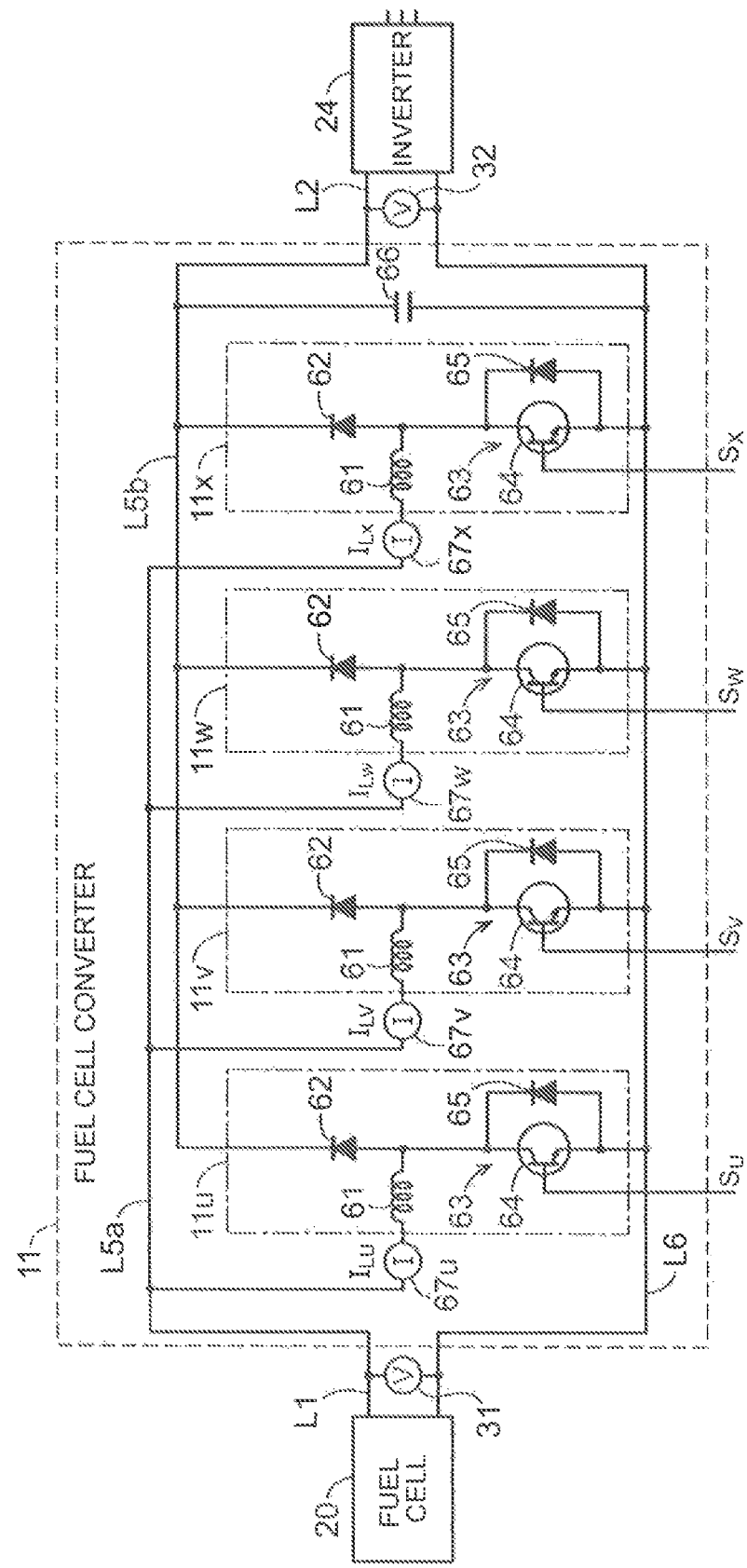
FIG. 2 is a schematic view illustrating a configuration of a fuel cell converter.

FIG. 2 is a schematic view illustrating a configuration of the fuel cell converter 11. In FIG. 2, the fourth direct current lead wire L4 connected to the second direct current lead wire L2 is not illustrated herein for convenience.

The fuel cell converter 11 is constituted as a four-phase bridge converter, and includes a U-phase circuit portion $11_U$, a V-phase circuit portion $11_V$, a W-phase circuit portion $11_W$, and an X-phase circuit portion $11_X$. The circuit portions $11_U$, $11_V$, $11_W$, $11_X$ of respective phases are connected to first and second power lines L5a, L5b and an earth line L6.

The first power line L5a is an input-side power line connected to the fuel cell 20, and the second power line L5b is an output-side power line connected to the inverter 24. The earth line L6 provides a reference potential to both the fuel cell 20 and the inverter 24.

The circuit portions $11_U$, $11_V$, $11_W$, $11_X$ of respective phases each include a reactor 61, an output diode 62, and a switching element 63. The reactor 61 is an element configured to accumulate an electrical energy. An input terminal of the reactor 61 is connected to the first power line L5a. An output terminal of the reactor 61 is connected to the second power line L5b via the diode 62 and is also connected to the earth line L6 via the switching element 63.

The diode 62 is provided such that a direction directed toward the second power line L5b from the reactor 61 is along a forward direction. The flow of the current from the second power line L5b to the reactor 61 is restricted by the diode 62.

The switching element 63 is constituted by a transistor 64 and a protection diode 65. The transistor 64 is an npn-type transistor, and is constituted by an IGBT (Insulated Gate Bipolar Transistor), an electric-power MOS (Metal Oxide Semiconductor) transistor, an electric-power bipolar transistor, and the like. The transistor 64 is connected such that a reactor-61 side is a collector and an earth-line-L6 side is an emitter. The protection diode 65 is connected between the collector and the emitter of the transistor 64 in a direction reverse to a direction where a collector current flows.

A corresponding one of control signals $S_U$, $S_V$, $S_W$, $S_X$ for setting a duty ratio (described later) of the switching element 63 is input from the controlling portion 50 to a base terminal of the transistor 64 of each of the circuit portions $11_U$, $11_V$, $11_W$, $11_X$ of respective phases. End letters U, V, W, X of respective reference signs indicate respective phases of their corresponding circuit portions. The switching element 63 of each of the circuit portions $11_U$, $11_V$, $11_W$, $11_X$ of respective phases repeats turning-on and turning-off in response to a corresponding one of the control signals $S_U$, $S_V$, $S_W$, $S_X$ input therein. In the present embodiment, for convenience, the control signals $S_U$, $S_V$, $S_W$, $S_X$ input into the circuit portions $11_U$, $11_V$, $11_W$, $11_X$ of respective phases are collectively referred to as a "control signal S" when it is not necessary to distinguish them from each other in particular.

When the switching element 63 is turned on, a current starts to flow into the switching element 63 from the fuel cell 20 via the reactor 61, and a magnetic energy due to dc excitation is accumulated in the reactor 61. When the switching element 63 is turned off, the magnetic energy accumulated in the reactor 61 during a period when the reactor 61 is turned on is output to the inverter 24 as a current via the diode 62 and the second power line L5b.

As such, while the switching element 63 is turned on and the current flows through the reactor 61, the magnetic energy is accumulated in the reactor 61 as an electrical energy.

While the switching element 63 is turned off, the magnetic energy accumulated in the reactor 61 is discharged, so that the current flows into the second power line L5*b* from the reactor 61.

An induced voltage generated by the magnetic energy accumulated in the reactor 61 when the switching element 63 is turned off is superimposed on an output voltage of the fuel cell 20. Accordingly, the voltage of the second power line L5*b*, which is an output voltage of each of the circuit portions $11_U$, $11_V$, $11_W$, $11_X$ of respective phases, is higher than a voltage of the first power line L5*a*, which is the output voltage of the fuel cell 20.

Control signals S are transmitted to the circuit portions $11_U$, $11_V$, $11_W$, $11_X$ of respective phases so that the switching elements 63 of the circuit portions $11_U$, $11_V$, $11_W$, $11_X$ of respective phases are turned on sequentially, and output voltages of the circuit portions $11_U$, $11_V$, $11_W$, $11_X$ of respective phases are sequentially superimposed on each other. Hereby, a voltage input into the inverter 24 is maintained higher than the output voltage of the fuel cell 20.

Due to the above operation, the fuel cell converter 11 increases the voltage input from the fuel cell 20 and inputs the voltage to the inverter 24. Note that, in the present embodiment, a smoothing capacitor 66 is provided between the inverter 24 and the X-phase circuit portion $11_X$. The smoothing capacitor 66 is connected to the second power line L5*b* and the earth line L6. The smoothing capacitor 66 functions to reduce a voltage fluctuation between the second power line L5*b* and the earth line L6.

In the present embodiment, current measuring portions $67_U$, $67_V$, $67_W$, $67_X$ are provided on respective input sides of respective reactors 61 of the circuit portions $11_U$, $11_V$, $11_W$, $11_X$ of respective phases. End letters U, V, W, X of respective reference signs indicate respective phases of the circuit portions where they are provided. Each of the current measuring portions $67_U$, $67_V$, $67_W$, $67_X$ is provided between an input terminal of its corresponding reactor 61 and the first power line L5*a*. The current measuring portions $67_U$, $67_V$, $67_W$, $67_X$ are constituted by a current sensor, for example.

The current measuring portions $67_U$, $67_V$, $67_W$, $67_X$ measure currents (reactor currents) flowing into respective reactors 61 of their corresponding circuit portions $11_U$, $11_V$, $11_W$, $11_X$ of respective phases, and transmit measured values $I_{LU}$, $I_{LV}$, $I_{LW}$, $I_{LX}$ to the controlling portion 50. In the present specification, the measured values $I_{LU}$, $I_{LV}$, $I_{LW}$, $I_{LX}$ of the reactor currents of the respective phases are collectively referred to a "measured value $I_L$ of a reactor current," or merely referred to as a "reactor current $I_L$" if it is not necessary to distinguish the measured values $I_{LU}$, $I_{LV}$, $I_{LW}$, $I_{LX}$ from each other. The reactor current $I_L$ increases and decreases periodically by ON/OFF operations of the switching element. Note that, each of the current measuring portions $67_U$, $67_V$, $67_W$, $67_X$ may be provided between its corresponding diode 62 and the second power line L5*b*, so as to measure the reactor current $I_L$ on an output side of its corresponding reactor 61.

Figure 3:
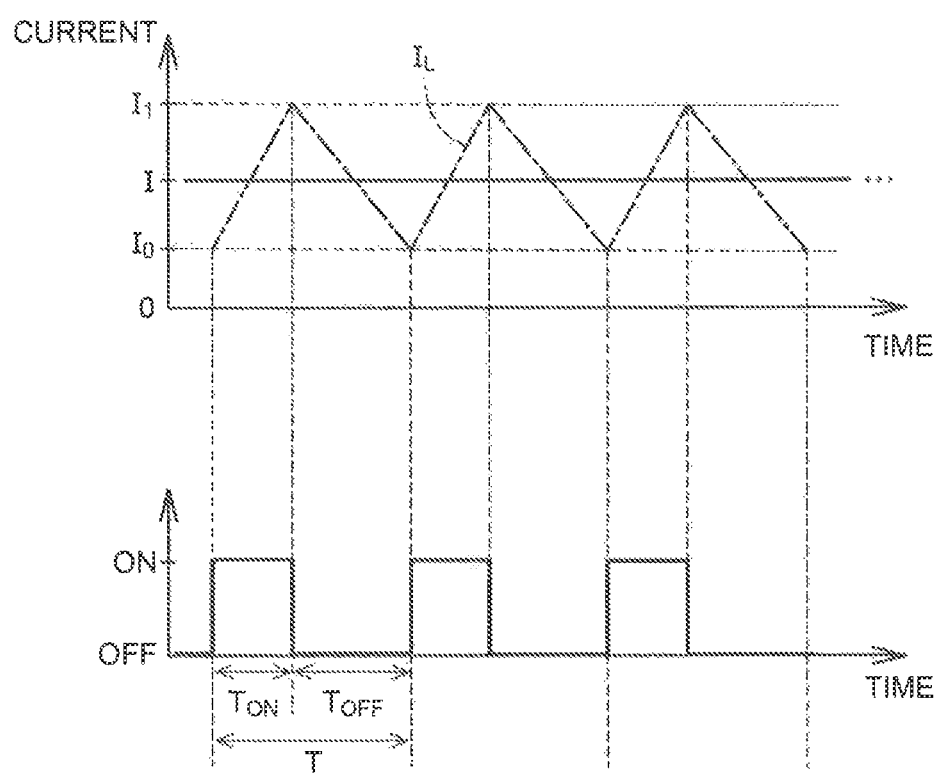
FIG. 3 is an explanatory view to describe an output current of a reactor and a duty ratio.

Referring now to FIG. 3, the following describes a current measured value I, which is a measured value of an output current of the reactor 61, and a duty ratio D to drive the fuel cell converter 11. FIG. 3 illustrates an exemplary timing chart illustrating time changes of a reactor current $I_L$ and a current measured value I, and ON/OFF timings of the switching element 63. In FIG. 3, the time change of the reactor current $I_L$ is indicated by an alternate long and short dash line, and the time change of the current measured value I is indicated by a continuous line. The example of FIG. 3 is obtained when the current measured value I is generally uniform.

As described above, when the switching element 63 is turned on, the reactor current $I_L$ starts to increase, and when the switching element 63 is turned off, the reactor current $I_L$ starts to decrease. The reactor current $I_L$ shows a minimum value $I_0$ at the beginning of one cycle, and shows a maximum value Ii at the time when the switching element 63 is turned off. In this example, the reactor current $I_L$ returns to the minimum value $I_0$ again at the end of the one cycle. In the present embodiment, an average value of the reactor current $I_L$ with respect to the time per one cycle is the current measured value I acquired by the current value acquisition portion 51 of the controlling portion 50. In the present specification, when the output current of the reactor 61 is referred to, it indicates a current expressed by the current measured value I.

At the end of one cycle, the current value acquisition portion 51 calculates current measured values I in the cycle by use of respective measured values $I_{LU}$, $I_{LV}$, $I_{LW}$, $I_{LX}$ acquired from the current measuring portions $67_U$, $67_V$, $67_W$, $67_X$. The current value acquisition portion 51 acquires respective current measured value I of the reactors 61 of the circuit portions $11_U$, $11_V$, $11_W$, $11_X$ of respective phases.

As described above, in the present embodiment, the converter controlling portion 53 of the controlling portion 50 sets a duty ratio D for each of the circuit portions $11_U$, $11_V$, $11_W$, $11_X$ of respective phases, the duty ratio D being a ratio of an accumulation period during which the switching element 63 is opened and a magnetic energy is accumulated as an electrical energy in one cycle of the driving period of the fuel cell converter 11. In FIG. 3, a period of one cycle is indicated by T, a period during which the switching element 63 is opened is indicated by $T_{ON}$, and a period during which the switching element 63 is closed is indicated by $T_{OFF}$. In the example of FIG. 3, the duty ratio D is $T_{ON}/T$.

The converter controlling portion 53 sets respective duty ratios D of the circuit portions $11_U$ to $11_X$ of respective phases per one cycle, so as to control respective output currents flowing from respective reactors 61 of the circuit portions $11_U$ to $11_X$ of respective phases. When the duty ratio D is increased, a ratio of a turn-on period $T_{ON}$ of the switching element 63 in the period T of one cycle becomes large, so that the output current of the reactor 61 is increased. In the meantime, when the duty ratio D is decreased, the ratio of the turn-on period $T_{ON}$ of the switching element 63 in the period T of one cycle becomes small, so that the output current of the reactor 61 is decreased.

Figure 4:
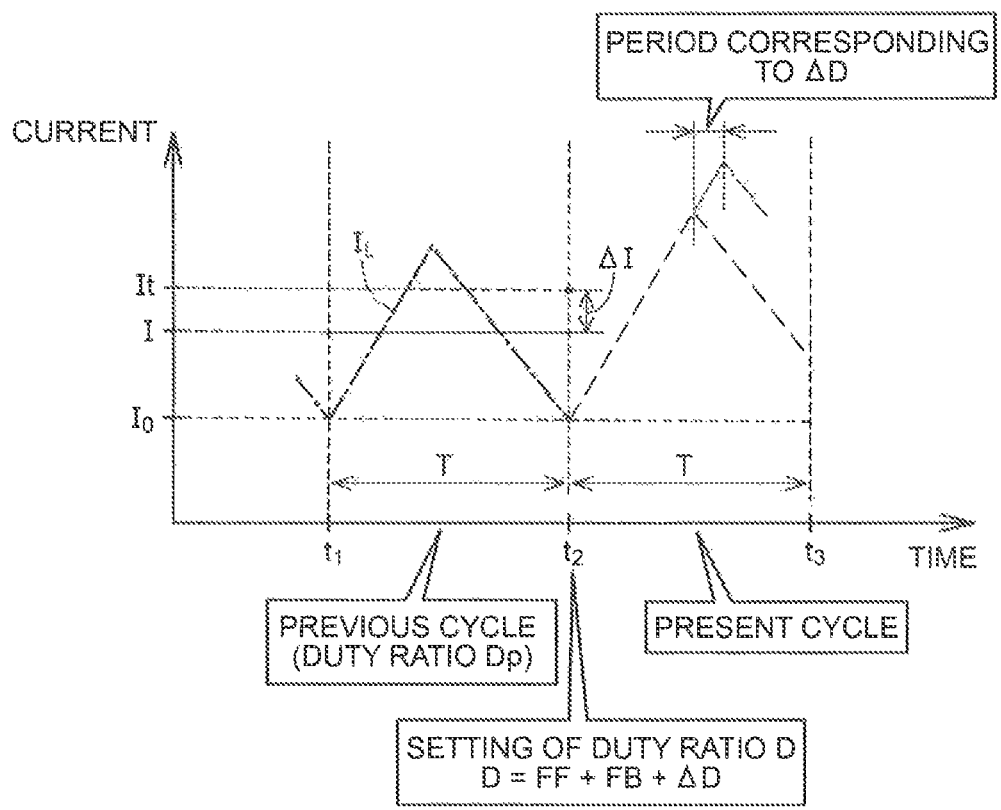
FIG. 4 is an explanatory view to describe an outline of setting of the duty ratio.

FIG. 4 is an explanatory view to describe an outline of the setting of the duty ratio D by the converter controlling portion 53. FIG. 4 illustrates an example of the time change of the reactor current $I_L$. Respective duty ratios D of the circuit portions $11_U$, $11_V$, $11_W$, $11_X$ of respective phases are set by the same method, so the following describes a setting method of a duty ratio D in the fuel cell converter 11 without distinguishing the circuit portions $11_U$, $11_V$, $11_W$, $11_X$ of respective phases from each other.

In the present embodiment, the converter controlling portion 53 sets a duty ratio D per one cycle at the beginning of the one cycle. In the following description, a cycle in which the switching element 63 is opened and closed at the duty ratio D set by the converter controlling portion 53 is referred to as a "present cycle." Further, a cycle just before that is referred to as a "previous cycle."

The following describes a case where the converter controlling portion 53 sets a duty ratio D at a time $t_2$. In this case, a period between the time $t_2$ and a time $t_3$ is the present cycle, and a period between a time $t_1$ and the time $t_2$ is the previous cycle. At the time $t_2$, the converter controlling portion 53 sets a current target value It, which is a target value of the output current of the reactor 61, so as to correspond to a present output request. Details of the setting of the current target value It corresponding to the output request will be described later. At the time $t_2$, the converter controlling portion 53 further acquires a current measured value I in the previous cycle, which is acquired by the current value acquisition portion 51.

When the current target value It changes from the previous cycle, a deviation occurs between the current target value It and the current measured value I in general. Further, even if the current target value It does not change from the previous cycle, a deviation might occur between the current target value It and the current measured value I due to an operating state of the fuel cell 20 or the like factors. In the following description, the deviation is referred to as a "current deviation ΔI." As shown in Expression (5) as below, the current deviation ΔI is calculated as a value obtained by subtracting the current measured value I in the previous cycle from the current target value It in the present cycle.

$$\Delta I = It - I \quad (5)$$

The duty ratio D is set in a direction where the current deviation ΔI caused at the beginning of the present cycle is eliminated. In the present embodiment, the converter controlling portion 53 sets the duty ratio D by use of Expression (6) as below. Hereinafter, "FF," "FB," and "ΔD," which are terms constituting Expression (6), will be described sequentially.

$$D = FF + FB + \Delta D \quad (6)$$

"FF" is a feedforward term indicating a feedforward component in the duty ratio D. In the present specification, the feedforward component indicates a component determined by either one of an actual value or a measured value indicative of a present state and a target value indicative of a state to be achieved subsequently (including a command value, the same shall apply hereinafter). In the present embodiment, FF is found by Expression (7) as follows.

$$FF = 1 - (V_L/V_H) \quad (7)$$

$V_L$ and $V_H$ in Expression (7) are an input side voltage value $V_L$ and an output side voltage value $V_H$, which are acquired by the voltage value acquisition portion 52 at the beginning of the present cycle. As described above, in the present embodiment, the input side voltage value $V_L$ and the output side voltage value $V_H$ are actual values, and a value of FF is determined by a present input voltage and a present output voltage of the fuel cell converter 11.

"FB" is a feedback term indicating a feedback component in the duty ratio D. In the present specification, the feedback component indicates a component that eliminates a deviation between an actual value or a measured value indicative of a present state and a target value indicative of a state to be achieved subsequently. In the present embodiment, FB is basically derived from Expression (8).

$$FB = -K \cdot (I - It) \quad (8)$$

Note that, in the present embodiment, a value different from the value derived from Expression (8) may be set to FB (details will be described later). K in Expression (8) is a proportional gain and is a coefficient determined in advance to convert a component indicative of a current into a component indicative of a duty ratio. In Expression (8), at the time of calculation of FB, an integration term obtained by multiplying, by an integral gain, a cumulative value of the deviation between the current measured value I and the current target value It may be added in addition to a proportional term having the proportional gain. Note that the proportional gain and the integral gain have a function to moderate a change of FB with respect to the size of the deviation to be eliminated. Hereby, even if the deviation is remarkably large, overshoot or hunting of the output current of the reactor 61 due to an excessive increase of the duty ratio D is restrained.

"ΔD" is a term to be added to FF so as to correspond to a sudden change of the target value. In the following description, ΔD is also referred to as an "addition term." Among the components of the duty ratio D, only FF and FB might not follow an increase of the current deviation ΔI due to the sudden change of the target value. When ΔD is added to FF, a period during which the switching element 63 is opened in one cycle can be lengthened only by a period corresponding to ΔD, and a maximum value that the reactor current $I_L$ can take in the present cycle is raised. This accordingly makes it possible to increase the current measured value I in the present cycle. In FIG. 4, a change of the reactor current $I_L$ in the present cycle by the addition of ΔD is illustrated conceptually. In the present embodiment, ΔD is basically derived from Expression (1) as below.

$$\Delta D = \frac{V_L}{V_H}\left(1 - \sqrt{1 - \frac{V_H}{V_L} \cdot Dp \cdot \frac{\Delta I}{I - I_0}}\right) \quad (1)$$

Note that, in the present embodiment, a value different from the value derived from Expression (1) may be set to ΔD (details will be described later). $V_L$ and $V_H$ in Expression (1) are an input side voltage value $V_L$ and an output side voltage value $V_H$ acquired by the voltage value acquisition portion 52 at the beginning of the present cycle. Dp is a duty ratio in the previous cycle, that is, a previous value of the duty ratio D. I is a current measured value I in the previous cycle. ΔI is a current deviation ΔI detected at the beginning of the present cycle. $I_0$ is a minimum value of the reactor current $I_L$ measured at the beginning of the previous cycle.

ΔD found by Expression (1) can be interpreted as a value determined so that the duty ratio Dp in the previous cycle and the current deviation ΔI are reflected. Further, ΔD can be interpreted as a value determined so as to correspond to an increase of the output current of the reactor 61 in the present cycle so that the increase of the output current of the reactor 61, corresponding to the current deviation ΔI, is obtained in the present cycle. Expression (1) derives a value of ΔD based on an output state of the reactor current $I_L$ in the previous cycle so that the increase of the output current of the reactor 61, corresponding to the current deviation ΔI, can be achieved in the present cycle. Further, it may be said that Expression (1) is a function expression defined such that ΔD takes a value that can increase the current measured value I more than an actual value only by an amount corresponding to the current deviation ΔI if ΔD is added to the duty ratio D in the previous cycle. A principle that derives Expression (1) will be described later.

Figure 5:
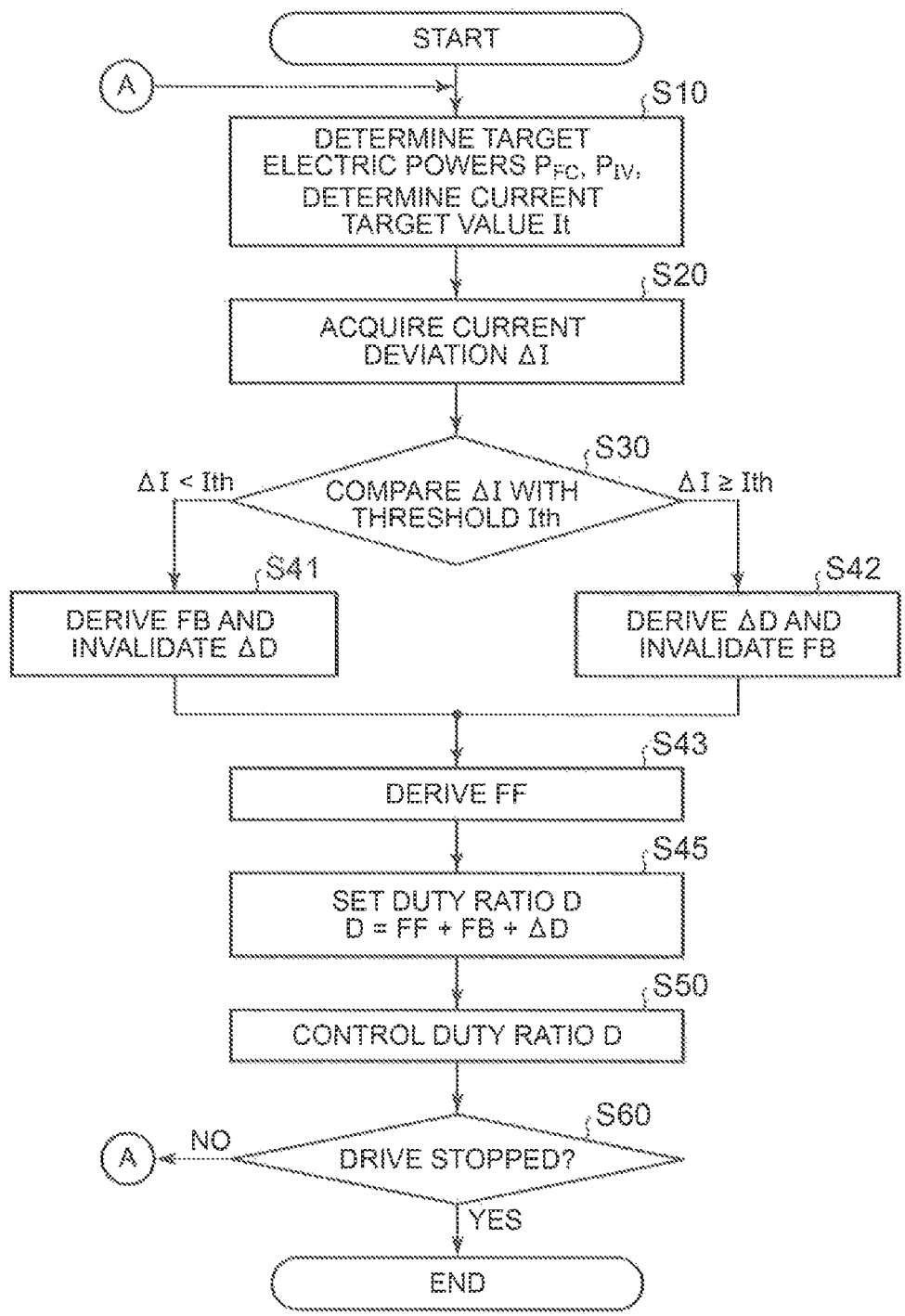
FIG. 5 is an explanatory view illustrating a flow of a control process of the voltage control system by a controlling portion.

Referring now to FIG. 5, the following describes a flow of the control process of the voltage control system 10 by the controlling portion 50 by use of the duty ratio D. After the fuel cell system 100 is started, the controlling portion 50 repeats a series of processes of the following steps S10 to S60 for a predetermined control period until the fuel cell system 100 is stopped. Note that the present embodiment is described on the premise that the control period of the controlling portion 50 is the same as a driving period T of the fuel cell converter 11, for convenience. The control period of the controlling portion 50 may not necessarily be the same as the driving period T of the fuel cell converter 11, and may be longer than the driving period of the fuel cell converter 11.

In step S10, the controlling portion 50 determines a target electric power $P_{FC}$ to be output from the fuel cell 20 and a target electric power $P_{IV}$ to be input into the inverter 24. The controlling portion 50 acquires an output request from a driver through the accelerator pedal AP of the fuel cell vehicle, and determines the target electric powers $P_{FC}$, $P_{IV}$ corresponding to the output request. In a case where an automatic control such as automatic driving is performed in the fuel cell vehicle, the controlling portion 50 may determine the target electric powers $P_{FC}$, $P_{IV}$ so as to correspond to an output request generated by the automatic control. Further, in addition to or instead of such an output request, the controlling portion 50 may determine the target electric powers $P_{FC}$, $P_{IV}$ so as to reflect a control request generated internally for the operation of the fuel cell system 100 or the fuel cell vehicle, such as electric power to be supplied to the accessories provided in the fuel cell vehicle. For example, the controlling portion 50 may determine a power generation amount of the fuel cell 20 for warming up of the fuel cell 20 and other accessories based on an outside temperature, a temperature of the fuel cell 20, and a charged state (SOC) of the secondary battery 21, and determine the target electric powers $P_{FC}$, $P_{IV}$ based on the power generation amount. At the time of determining the target electric powers $P_{FC}$, $P_{IV}$, present output characteristics (I-V characteristics) of the fuel cell 20, the SOC of the secondary battery 21, and the like may be taken into consideration.

Subsequently, the controlling portion 50 determines a target voltage $V_{FC}$ of the fuel cell 20 to obtain the target electric power $P_{FC}$ based on the present I-V characteristics of the fuel cell 20, and sets the target voltage $V_{FC}$ as a target value $V_{Lt}$ of the input voltage of the fuel cell converter 11. Further, the controlling portion 50 starts an operation control of the fuel cell 20 corresponding to the target voltage $V_{FC}$ of the fuel cell 20. More specifically, the controlling portion 50 controls a supply amount of reactant gases to the fuel cell 20. Further, the converter controlling portion 53 of the controlling portion 50 determines a target value $V_{Ht}$ of the output voltage of the fuel cell converter 11 in the present cycle and a current target value It, which is a target value of the output current of each reactor 61 in the present cycle, so as to correspond to the target electric power $P_{IV}$ to be input into the inverter 24.

In step S20, the converter controlling portion 53 acquires a current deviation ΔI. As shown in Expression (5), the converter controlling portion 53 calculates the current deviation ΔI by subtracting, from the current target value It, the current measured value I indicative of an output current of the reactor 61 in the previous cycle.

In steps S30 to S45, the converter controlling portion 53 calculates a duty ratio D by use of Expression (6). In the present embodiment, in a case where the current deviation ΔI is remarkably large, the duty ratio D is calculated by setting the addition term ΔD in Expression (6) to an effective value derived by use of Expression (1) so that the current deviation ΔI is as small as possible in the present cycle. In the meantime, if the current deviation ΔI is a small value to such an extent that the current deviation ΔI can be compensated by FB in Expression (6), the addition term ΔD of Expression (6) is set to an invalid value derived without using Expression (1), so as to calculate the duty ratio D. This will be described below, more specifically.

In step S30, the converter controlling portion 53 performs a determination on the current deviation ΔI. The converter controlling portion 53 compares the current deviation ΔI with a predetermined threshold Ith. The threshold Ith should be a positive actual number found experimentally in advance as a value that might cause a response delay of the fuel cell converter 11 at the time when its corresponding current deviation ΔI is caused.

When the current deviation ΔI is less than the threshold Ith (ΔI<Ith), the converter controlling portion 53 derives FB by use of Expression (8) (step S41). Further, the converter controlling portion 53 sets ΔD to an invalid value that loses a substantial function of ΔD, without deriving ΔD by use of Expression (1). More specifically, the converter controlling portion 53 may set ΔD to 0 or a value close to 0, or may set ΔD to an extremely small value (e.g., a value of around several percent of FB) with respect to FB.

When the current deviation ΔI is the threshold Ith or more (ΔI≥Ith), the converter controlling portion 53 sets ΔD to a value derived by use of Expression (1) (step S42). Further, the converter controlling portion 53 sets FB to an invalid value that loses a substantial function of FB, without deriving FB by use of Expression (8). More specifically, the converter controlling portion 53 may set FB to 0 or a value close to 0, or may set FB to an extremely small value (e.g., a value of around several percent of ΔD) with respect to ΔD. Alternatively, the converter controlling portion 53 may set FB to a value derived by use of Expression (8) in the previous cycle. Note that FB may not necessarily be set to an invalid value, and a value derived by use of Expression (8) may be set as FB.

In step S43, the converter controlling portion 53 derives FF by use of Expression (7). FF may be derived before step S41 or step S42. In step S45, the converter controlling portion 53 adds up FF, FB, and ΔD thus set so as to calculate the duty ratio D, as shown in Expression (6).

In step S50, the converter controlling portion 53 causes the fuel cell converter 11 to perform a boost operation at the duty ratio D set in step S45. More specifically, the converter controlling portion 53 generates a control signal S indicative of the duty ratio D and transmits it to the switching element 63 of each of the circuit portions $11_U$, $11_V$, $11_W$, $11_X$ of respective phases, so as to set an opening/closing period of the switching element 63. The duty ratio D derived by setting ΔD to an effective value via step S42 corresponds to a subordinate concept of the duty ratio in the present disclosure, and the duty ratio D derived by setting ΔD to an invalid value via step S41 corresponds to a subordinate concept of another duty ratio in the present disclosure, Here, since the addition term ΔD is a component to eliminate the current deviation ΔI as described above, the addition term ΔD can be also interpreted as one type of a feedback term in view of the definition of the feedback component. Note that ΔD is a component intended to minimize the current deviation ΔI in one cycle of the present cycle. On the other hand, FB is a component intended to cause the current measured value I to gradually come close to the current target value It by repeating multiple cycles, and is set to moderately change relative to the change of the current deviation ΔI as compared to ΔD. Thus, it may be said that FB and ΔD resemble each other even though their actions to the duty ratio D are not the same. When the duty ratio D is increased, the use of FB and ΔD both as effective values causes respective functions to work in an overlapped manner, which might result in that the duty ratio D is rather separated from an originally targeted value. In view of this, in the present embodiment, when the current deviation ΔI is the threshold Ith or more, ΔD is set to an effective value derived by use of Expression (1), and in the meantime, when the current deviation ΔI is less than the threshold Ith, ΔD is set to an invalid value, as described above. This restrains the decrease in the controllability of the fuel cell converter 11 due to the interference between respective functions of FB and ΔD on the calculation of the duty ratio D.

The controlling portion 50 repeats processes of steps S10 to S50 with the control period T until the operation of the fuel cell system 100 is stopped (step S60). A case where the operation of the fuel cell system 100 is stopped may be a case where the supply of the electric power from the fuel cell 20 to other parts is cut off, or may be a case where the operation of the fuel cell 20 is stopped. Note that, in the present embodiment, the controlling portion 50 stores the duty ratio D in the present cycle as a duty ratio Dp in a previous cycle before shifting to a next cycle, and stores a measured value of a present reactor current $I_L$ as a minimum value $I_0$ of the reactor current $I_L$ in the present cycle. These values are used in the next cycle for calculation of ΔD in step S42.

Figure 6:
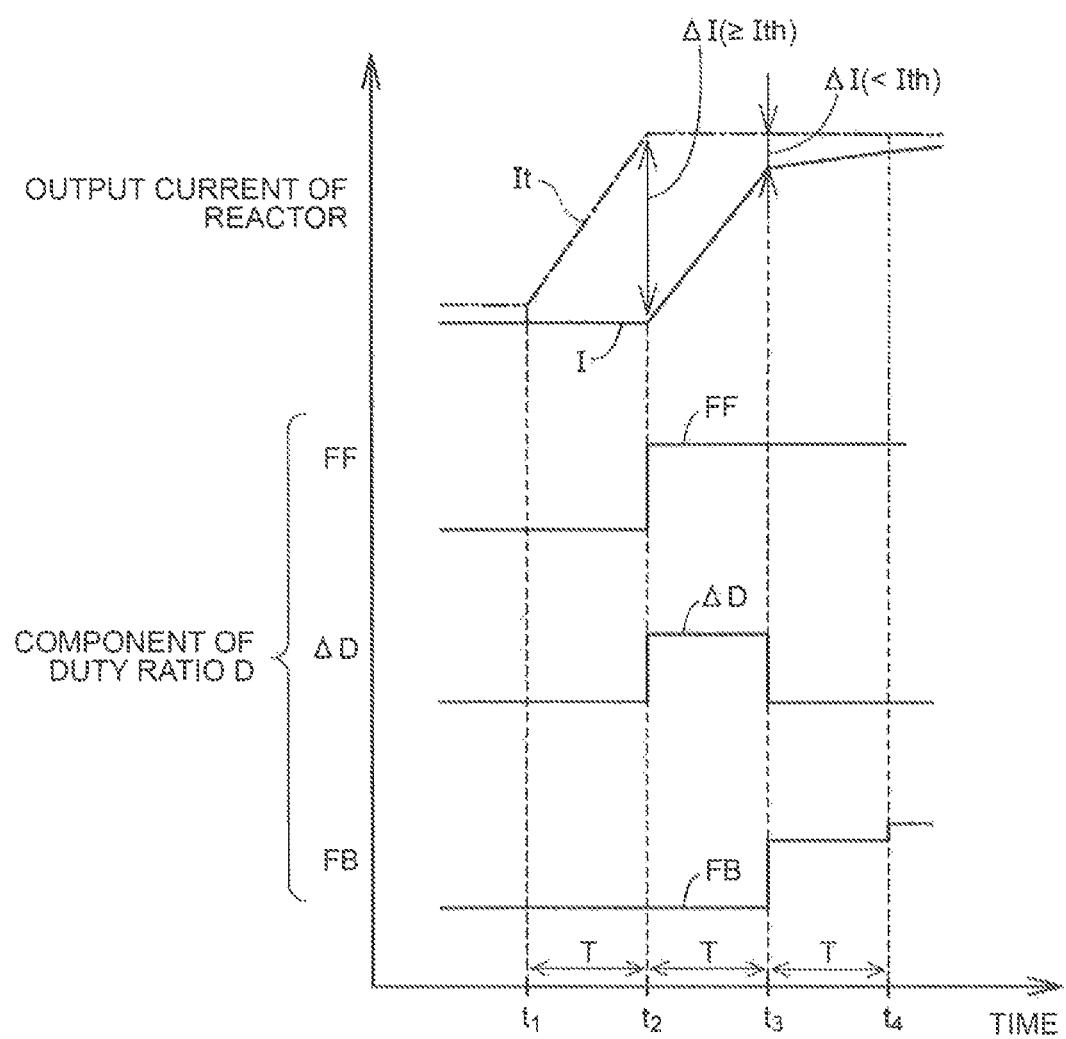
FIG. 6 is an explanatory view illustrating an exemplary timing chart indicative of respective changes of a current target value, a current measured value, and FF, ΔD, and FB in a duty ratio D.

FIG. 6 is an explanatory view illustrating an exemplary timing chart indicative of respective changes of the current target value It of the output current of the reactor 61, the current measured value I, and FF, ΔD, and FB in the duty ratio D. In FIG. 6, a time axis is divided per control period T (times $t_1$ to $t_4$). The following deals with a case where the current target value It increases so that the current deviation ΔI becomes the threshold Ith or more during one cycle between the time $t_1$ and the time $t_2$.

The converter controlling portion 53 performs a determination to compare the current deviation ΔI with the threshold Ith at the time $t_2$ (step S30). In this example, since ΔI≥Ith is established, ΔD is set by use of Expression (1) and FB is set to an invalid value (step S42), and FF is set by use of Expression (7) (step S43). They are added up to calculate the duty ratio D (step SS45), and the control at the duty ratio D is started (step S50).

ΔD derived by use of Expression (1) is added to the duty ratio D set at the time $t_2$. As described above, Expression (1) is a function expression for setting ΔD to a value that can achieve the increase of the output current of the reactor 61 so as to correspond to the current deviation ΔI in one cycle. On that account, in a cycle between the time $t_2$ and the time $t_3$, the current measured value I is greatly increased to come close to the current target value It.

At the time $t_3$, if the current deviation ΔI is a value smaller than the threshold Ith, the converter controlling portion 53 sets FB by use of Expression (8) and sets ΔD to an invalid value at the time of calculation of the duty ratio D (steps S41 to S45). Thus, in the cycles after the time $t_3$, a difference between the current target value It and the current measured value I is gradually reduced mainly by FB without using the addition term ΔD for the calculation of the duty ratio D.

As described above, with the voltage control system 10 of the present embodiment, when the output request that remarkably increases the current deviation ΔI is made to the fuel cell system 100, the duty ratio D using ΔD derived from Expression (1) is set. As will be described later, Expression (1) is a function expression defined to derive ΔD that can achieve the increase of the output current of the reactor 61 so as to correspond to the current deviation ΔI. On that account, the current deviation ΔI can be greatly reduced by the next cycle by use of the duty ratio D. Further, ΔD is a value determined based on an output state of the reactor current in the previous cycle so that a target increasing amount is obtained. That is, ΔD is set as a value in conformity with a present situation in order to achieve the target value. Therefore, the time to eliminate the current deviation ΔI is shortened more, thereby making it possible to restrain an occurrence of a response delay with respect to a remarkable increase of the output request.

In order to derive FF, which is a feedforward component of the duty ratio D, the voltage control system 10 of the present embodiment uses actual values as the input side voltage value $V_L$ indicative of an input voltage of the fuel cell converter 11 and the output side voltage value $V_H$ indicative of an output voltage thereof. Accordingly, even if a remarkable gap has occurred between a target value and a present value in terms of the input voltage and the output voltage, it is possible to restrain the duty ratio D from being affected by the remarkable gap. This makes it possible to restrain occurrences of overcurrent and overvoltage in the fuel cell converter 11 due to such a gap between the target value and the present value in terms of the input voltage and the output voltage. Particularly, the output voltage of the fuel cell is generally high, e.g., about 100 V, and easily fluctuates depending on a condition such as the operating state. However, with the fuel cell system 100 of the present embodiment, since the voltage control system 10 is provided, it is possible to reduce the influence of a gap between the target value and the present value in terms of the input voltage and the output voltage in the fuel cell converter 11, the gap being caused due to the fluctuation of the output voltage of the fuel cell 20. This makes it possible to obtain higher effects.

In the voltage control system 10 of the present embodiment, when the current deviation ΔI is small originally or when the current deviation ΔI is decreased by the control using effective ΔD, AD is set to an invalid value, so that the current deviation ΔI is gradually reduced by FB. This accordingly makes it possible to restrain the duty ratio D from becoming large mainly due to AD when the current deviation ΔI is small. Further, in this case, the output current of the reactor 61 is controlled by FB more precisely in a direction where the current deviation ΔI is reduced, which makes it possible to obtain a higher controllability.

In the voltage control system 10 of the present embodiment, as shown in Expression (1), ΔD is derived by use of the input side voltage value $V_L$, the output side voltage value $V_H$, the current deviation ΔI, the current measured value I in the previous cycle, and the minimum value $I_0$ of the reactor current $I_L$ in the previous cycle. As such, appropriate ΔD can be easily found only by using given parameters, thereby making it possible to increase the controllability of the fuel cell converter 11 effectively.

Figure 7:
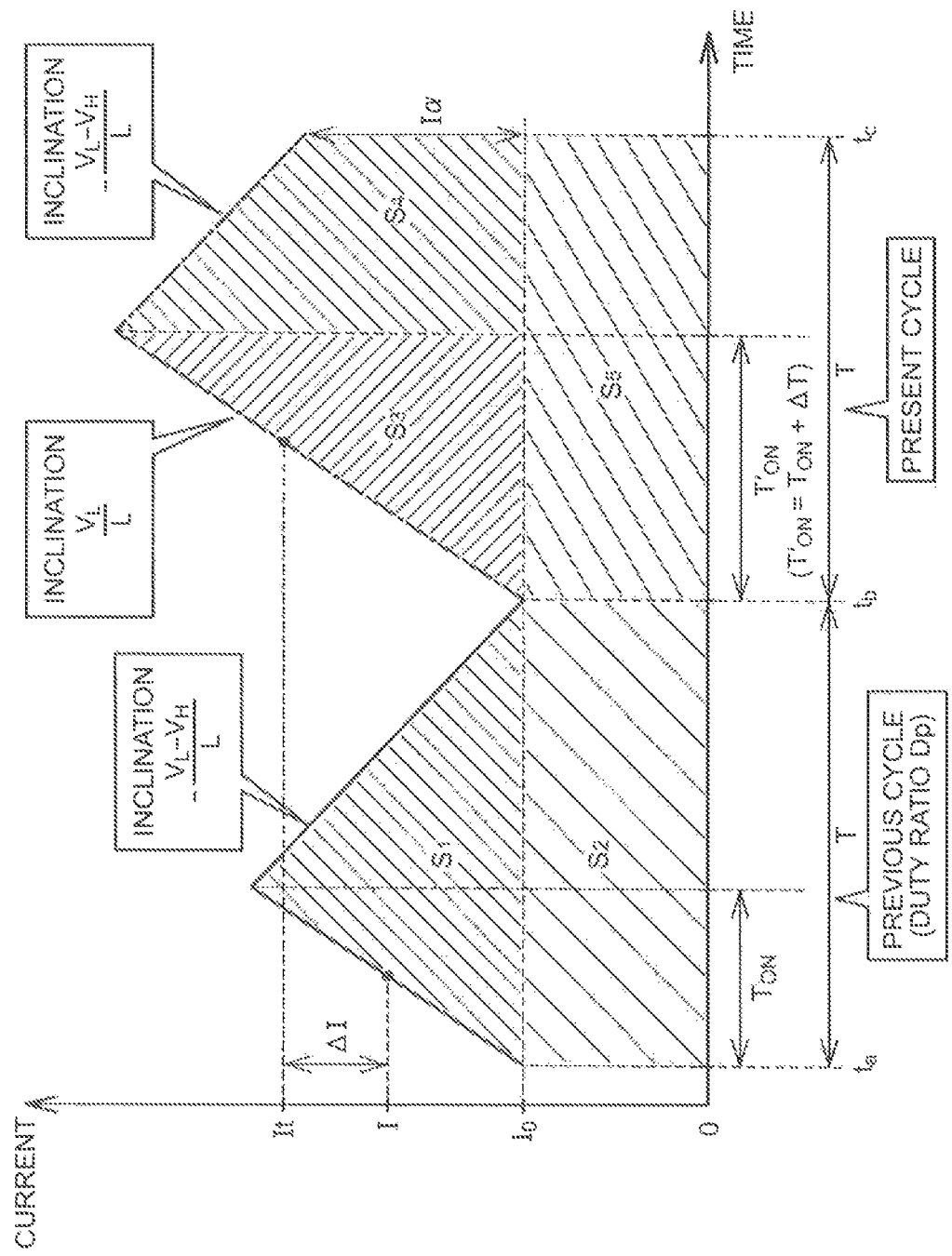
FIG. 7 is an explanatory view to describe a derivation method of a calculation formula of ΔD.

FIG. 7 is an explanatory view to describe a method for deriving Expression (1) to calculate ΔD. In FIG. 7, a graph indicating an example of a time change of the reactor current $I_L$ is illustrated. In a cycle between a time $t_a$ and a time $t_b$ in FIG. 7, a change of the reactor current $I_L$ at the time when the current measured value I corresponding to the current target value It in the cycle is indicated by a continuous line. Further, in a next cycle between the time $t_b$ and a time $t_c$, a change of the reactor current $I_L$ found to obtain a current measured value I corresponding to the current target value It in the cycle between the time $t_b$ and the time $t_c$ under the same condition as the cycle between the time $t_a$ and the time $t_b$ is indicated by an alternate long and short dash line. In the following description, the cycle between the time $t_a$ and the time $t_b$ is referred to as a "previous cycle," and the cycle between the time $t_b$ and the time $t_c$ is referred to as a "present cycle."

In the previous cycle, the reactor current $I_L$ changes at an inclination $V_H/L$ in a period $T_{ON}$ during which the switching element 63 is turned on, and the reactor current $I_L$ changes at an inclination $-(V_H-V_L)/L$ in a period during which the switching element 63 is turned off after that. $V_L$ indicates an input voltage of the fuel cell converter 11, $V_H$ indicates an output voltage of the fuel cell converter 11, and L indicates an inductance of the reactor 61. At this time, a duty ratio Dp in the previous cycle is expressed by Expression (9).

$$Dp = \frac{T_{ON}}{T} = 1 - \frac{V_L}{V_H} \quad (9)$$

Further, the current measured value I in the previous cycle can be found as a value obtained by dividing, by a time, a total sum of areas $S_1$, $S_2$ of two regions sectioned by different oblique hatchings. Accordingly, the current measured value I is expressed as Expression (10).

$$I = \left(\frac{1}{2} \cdot T \cdot \frac{V_L}{L} \cdot T_{ON} + I_0 \cdot T\right) \cdot \frac{1}{T} \quad (10)$$

$$I = \frac{1}{2} \cdot \frac{V_L \cdot T_{ON}}{L} + I_0$$

Further, in the previous cycle, the reactor current $I_L$ increases from a minimum value $I_0$ at the time $t_a$ and returns to the minimum value $I_0$ again at the time $t_b$, so that Expression (11) as below is obtained. Expression (11a) is derived by rearranging Expression (11), $$\frac{V_L}{L} \cdot T_{ON} - \frac{V_H - V_L}{L} \cdot (T - T_{ON}) = 0 \quad (11)$$

$$\frac{V_H - V_L}{L} \cdot T = \frac{V_H}{L} \cdot T_{ON} \quad (11a)$$

In the meantime, in the present cycle, a period during which the switching element 63 is turned on is assumed $T'_{ON}$, an increase time in the period from the previous cycle is assumed $\Delta T$, and an increasing amount of the duty ratio D in the present cycle from the duty ratio Dp of the previous cycle is assumed $\Delta D$. Hereby, the duty ratio D in the present cycle is expressed as Expressions (12), (13) as below, and $\Delta D$ and $\Delta T$ can be expressed as Expressions (14), (15) as below, respectively.

$$D = \frac{T'_{ON}}{T} \quad (12)$$

$$D = Dp + \Delta D \quad (13)$$

$$\Delta D = \frac{\Delta T_{ON}}{T} \quad (14)$$

$$\Delta T_{ON} = T'_{ON} - T_{ON} \quad (15)$$

A difference between the reactor current $I_L$ at the time $t_b$ and the reactor current $I_L$ at the time $t_c$ is assumed $I_\alpha$. $I_\alpha$ corresponds to an increasing amount of the reactor current $I_L$ in the present cycle. At this time, the input voltage and the output voltage of the fuel cell converter 11 are assumed the same as those of the previous cycle, so that $I_\alpha$ can be obtained as Expression (16) as below. Note that $\Delta T_{ON} = \Delta D \cdot T$ obtained from Expression (14) is substituted at the time of deriving Expression (16).

$$I_a = \frac{V_L}{L} \cdot T'_{ON} - \frac{V_H - V_L}{L} \cdot (T - T'_{ON}) \quad (16)$$

$$= -\frac{V_H - V_L}{L} \cdot T + \frac{V_H}{L} \cdot T'_{ON}$$

$$= \frac{V_H}{L} \cdot (T'_{ON} - T_{ON})$$

$$= \frac{V_H}{L} \cdot \Delta T_{ON}$$

$$I_a = \frac{V_H}{L} \cdot T \cdot \Delta D$$

A current target value It to be achieved in the present cycle can be found as a value obtained by dividing, by a time, a sum total of areas $S_3$, $S_4$, $S_5$ of three regions sectioned by different oblique hatchings. Accordingly, the current target value It is expressed as Expression (17) as below.

$$It = I_0 + \frac{1}{2} \cdot T'_{ON} \cdot \frac{V_L}{L} \cdot T'_{ON} \cdot \frac{1}{T} + \frac{1}{2} \cdot \left(I_a + \frac{V_L}{L} \cdot T'_{ON}\right) \cdot (T - T'_{ON}) \cdot \frac{1}{T} \quad (17)$$

$$It = I_0 + \frac{1}{2} \cdot \frac{V_H}{L} \cdot \Delta D \cdot (T - T'_{ON}) + \frac{1}{2} \cdot \frac{V_L}{L} \cdot T'_{ON}$$

A current deviation $\Delta I$ caused at the time $t_b$, which is the beginning of the present cycle, is expressed as Expression (18) as below from Expression (10) and Expression (17).

$$\Delta I = It - I \quad (18)$$

$$= \frac{1}{2} \cdot \frac{V_H}{L} \cdot \Delta D \cdot (T - T'_{ON}) + \frac{1}{2} \cdot \frac{V_L}{L} \cdot T'_{ON} - \frac{1}{2} \cdot \frac{V_L}{L} \cdot T_{ON}$$

$$= \frac{1}{2} \cdot \frac{V_H}{L} \cdot \Delta D \cdot (T - T_{ON} - \Delta T_{ON}) + \frac{1}{2} \cdot \frac{V_L}{L} \cdot T \cdot \Delta D$$

$$= \frac{1}{2} \cdot \frac{V_H}{L} \cdot \Delta D \cdot T \cdot (1 - Dp - \Delta D) + \frac{1}{2} \cdot \frac{V_L}{L} \cdot T \cdot \Delta D$$

$$= \frac{1}{2} \cdot \frac{T \cdot \Delta D}{L} \cdot (2 \cdot V_L - V_H \cdot \Delta D)$$

$$= \frac{V_L \cdot T}{L} \cdot \Delta D - \frac{1}{2} \cdot \frac{V_H \cdot T}{L} \cdot \Delta D^2$$

$$\Delta I = \frac{V_L \cdot T}{L} \cdot \Delta D - \frac{1}{2} \cdot \frac{V_H \cdot T}{L} \cdot \Delta D^2$$

When Expression (18) is rearranged into a quadratic equation about $\Delta D$, Expression (19) as below is obtained. A solution of $\Delta D$ is found from Expression (19). Then, $\Delta D$ is expressed as Expression (20) as below.

$$\Delta D^2 - 2 \cdot \frac{V_L}{V_H} \cdot \Delta D + 2 \cdot \frac{L}{V_H \cdot T} \cdot \Delta I = 0 \quad (19)$$

$$\Delta D = \frac{V_L}{V_H} \cdot \left(1 \pm \sqrt{1 - 2 \cdot \frac{V_H \cdot L}{V_L^2 \cdot T} \cdot \Delta I}\right) \quad (20)$$

Further, the duty ratio D is a value of not less than 0 but not more than 1, and therefore, $\Delta D$ is obtained as Expression (2) as below.

$$\Delta D = \frac{V_L}{V_H} \cdot \left(1 - \sqrt{1 - 2 \cdot \frac{V_H \cdot L}{V_L^2 \cdot T} \cdot \Delta I}\right) \quad (2)$$

Here, when $T_{ON}$ obtained by rearranging Expression (9) is substituted into Expression (10), Expression (21) is obtained as below. Further, Expression (22) is obtained by rearranging Expression (21).

$$I = \frac{1}{2} \cdot \frac{V_L}{L} \cdot T \cdot Dp + I_0 \quad (21)$$

$$2 \cdot \frac{L}{V_L \cdot T} = \frac{Dp}{I - I_0} \quad (22)$$

By rewriting Expression (2) by use of Expression (22), Expression (1) is obtained as follows.

$$\Delta D = \frac{V_L}{V_H} \left(1 - \sqrt{1 - \frac{V_H}{V_L} \cdot Dp \cdot \frac{\Delta I}{I - I_0}}\right) \quad (1)$$

Thus, Expression (1) is to obtain ΔD as an increasing amount from a duty ratio Dp necessary to obtain a current target value It that is higher than the current measured value I only by the current deviation ΔI in the present cycle at the time when $V_L$, $V_H$ are assumed the same as those in the previous cycle. That is, in accordance with Expression (1), ΔD is found as a value corresponding to an increasing amount that can increase the current measured value I obtained in the previous cycle only by an amount corresponding to the current deviation ΔI from an actual value if ΔD is added to the duty ratio Dp in the previous cycle. Accordingly, by use of the duty ratio D using ΔD derived from Expression (1), it is possible to further effectively restrain the occurrence of a response delay in the fuel cell converter 11 at the time when there is an increase of the output request that remarkably increases the current deviation ΔI.

B. Second Embodiment

A voltage control system as the second embodiment of the present disclosure has generally the same configuration as the voltage control system 10 described in the first embodiment except that an expression to derive an addition term ΔD is different. The voltage control system of the second embodiment is incorporated in a fuel cell system having a configuration similar to that of the fuel cell system 100 described in the first embodiment. In the voltage control system of the second embodiment, a boost operation of a fuel cell converter 11 is controlled by a flow similar to the flow described in FIG. 5. Note that a converter controlling portion 53 sets the addition term ΔD by use of Expression (2) as below in step S42.

$$\Delta D = \frac{V_L}{V_H} \cdot \left(1 - \sqrt{1 - 2 \cdot \frac{V_H \cdot L}{V_L^2 \cdot T} \cdot \Delta I}\right) \quad (2)$$

As described above, Expression (1) used for calculation of ΔD in the first embodiment is derived from Expression (2). Accordingly, ΔD derived by use of Expression (2) is substantially the same as ΔD described in the first embodiment. That is, ΔD is a term determined by reflecting a current deviation ΔI and a duty ratio Dp in a previous cycle. Further, ΔD is a terms determined so as to correspond to an increase of an output current of a reactor 61 in a present cycle so that the increase of the output current of the reactor 61, corresponding to the current deviation ΔI, is obtained in the present cycle. With Expression (2), it is possible to calculate ΔD by use of an input side voltage value $V_L$, an output side voltage value $V_H$, the current deviation ΔI, an inductance L, which is a coefficient set in advance, and a control period T. Accordingly, ΔD can be calculated without the use of the duty ratio Dp in the previous cycle and $I_0$, and thus, the calculation of ΔD is facilitated more. In addition, with the voltage control system and the fuel cell system of the second embodiment, it is possible to yield various effects similar to those described in the first embodiment.

C. Third Embodiment

A voltage control system as the third embodiment of the present disclosure has generally the same configuration as the voltage control system 10 described in the first embodiment except that an expression to derive an addition term ΔD is different. The voltage control system of the third embodiment is incorporated in a fuel cell system having a configuration similar to that of the fuel cell system 100 described in the first embodiment. In the voltage control system of the third embodiment, a boost operation of a fuel cell converter 11 is controlled by a flow similar to the flow described in FIG. 5. Note that a converter controlling portion 53 sets an addition term ΔD by use of Expression (3) as below in step S42.

$$\Delta D = \frac{L}{V_L \cdot T} \cdot \Delta I \quad (3)$$

With Expression (3), it is possible to calculate ΔD by use of a current deviation ΔI, an input side voltage value $V_L$, an inductance L, which is a coefficient set in advance, and a control period T. Expression (3) is derived as below from Expression (2) described in the first embodiment and used also in the second embodiment.

Here, when β is a given actual number that satisfies β<<1, Expression (23) as below is established.

$$(1+\beta)^{1/2} \approx 1 + (1/2) \cdot \beta \quad (23)$$

Therefore, Expression (2) can be substantially rewritten to an approximate expression shown as Expression (24) as below. By developing Expression (24), Expression (3) is obtained.

$$\Delta D \approx \frac{V_L}{V_H} \cdot \left\{1 - \left(1 - \frac{V_H \cdot L}{V_L^2 \cdot T} \cdot \Delta I\right)\right\} \quad (24)$$

As such, with the voltage control system of the third embodiment, the addition term ΔD can be calculated by simpler Expression (3), and a time to derive the addition term ΔD can be shortened. In addition, with the voltage control system and the fuel cell system of the third embodiment, it is possible to yield various effects similar to those described in the above embodiments.

D. Fourth Embodiment

A voltage control system as the fourth embodiment of the present disclosure has generally the same configuration as the voltage control system 10 described in the first embodiment except that an expression to derive an addition term ΔD is different. The voltage control system of the fourth embodiment is incorporated in a fuel cell system having a configuration similar to that of the fuel cell system 100 described in the first embodiment. In the voltage control system of the fourth embodiment, a boost operation of a fuel cell converter 11 is controlled by a flow similar to the flow described in FIG. 5. Note that a converter controlling portion 53 sets the addition term ΔD by use of Expression (4) as below in step S42.

$$\Delta D = \frac{1}{2} \cdot Dp \cdot \frac{\Delta I}{I - I_0} \quad (4)$$

Expression (4) is obtained by substituting Expression (22) into Expression (3) described in the third embodiment. With Expression (4), ΔD can be calculated by use of a current deviation ΔI, a duty ratio Dp in a previous cycle, a current measured value I, and a minimum value $I_0$ of a reactor current $I_L$ in the previous cycle. With Expression (4), a time to derive the addition term ΔD can be shortened. In addition, with the voltage control system and the fuel cell system of the fourth embodiment, it is possible to yield various effects similar to those described in the above embodiments.

E. Modifications

E1. Modification 1: In each of the above embodiments, the voltage value acquisition portion 52 acquires a measured value measured by the first voltage measuring portion 31 as the input side voltage value $V_L$ indicative of the input voltage of the fuel cell converter 11. Further, the voltage value acquisition portion 52 acquires a measured value measured by the second voltage measuring portion 32 as the output side voltage value $V_H$ indicative of the output voltage of the fuel cell converter 11. In this regard, the voltage value acquisition portion 52 may acquire a target value of the input voltage of the fuel cell converter 11, set by the controlling portion 50, as the input side voltage value $V_L$ indicative of the input voltage of the fuel cell converter 11, and may acquire a target value of the output voltage of the fuel cell converter 11, set by the controlling portion 50, as the output side voltage value $V_{11}$ indicative of the output voltage of the fuel cell converter 11. In this case, the converter controlling portion 53 uses the input side voltage value $V_L$ and the output side voltage value $V_H$, which are the target values, for the setting of the duty ratio D. With such a configuration, FF which is a feedforward component of the duty ratio D, is derived as a value corresponding to an output request, thereby making it possible to increase the followability to the output request of the fuel cell converter 11.

E2. Modification 2: In each of the above embodiments, the addition term ΔD is derived by use of any one of Expression (1) to Expression (4). In this regard, the addition term ΔD may be derived by use of other expressions. The expressions to derive the addition term ΔD may be determined by reflecting a current deviation ΔI generated at the beginning of the present cycle and a duty ratio Dp in the previous cycle, and determined so as to correspond to an increase of the output current of the reactor 61 such that the increase of the output current of the reactor 61 in the present cycle corresponds to the current deviation ΔI. Note that, in order that the current deviation ΔI and the duty ratio Dp in the previous cycle are reflected on ΔD, ΔD should change so as to correspond to the current deviation ΔI and the duty ratio Dp in the previous cycle. Accordingly, the expressions to derive ΔD may not be an expression in which the current deviation ΔI and the duty ratio Dp in the previous cycle are substituted directly.

E3. Modification 3: In each of the above embodiments, FF and FB added in the calculation of the duty ratio D may be derived by use of expressions other than Expression (7) and Expression (8) described in the first embodiment. FF may be derived by other expressions using the input side voltage value $V_L$ and the output side voltage value $V_H$, provided that FF functions as the feedforward term. FB is not limited to an expression that can provide a value corresponding to a difference between a measured value of the current and its target value, but may be derived from an expression that can provide a value corresponding to a difference between a measured value of the voltage and its target value, provided that FB functions as the feedback term. FB may be derived from an expression that can provide a value corresponding to a difference between a measured value of the electric power and its target value.

E4. Modification 4: In each of the above embodiments, the converter controlling portion 53 sets ΔD to an invalid value at the time when the current deviation ΔI is less than the threshold Ith determined in advance. In this regard, regardless of the size of the current deviation ΔI, the converter controlling portion 53 may set ΔD to a value derived from any of Expressions (1) to (4) described in the above embodiments without setting ΔD to an invalid value. Further, in step S42 in FIG. 5, FB may be set to a value derived from Expression (8) without being set to an invalid value.

E5. Modification 5: In each of the above embodiments, the fuel cell converter 11 is constituted by a four-phase bridge converter. In this regard, the fuel cell converter 11 may not be constituted by a four-phase bridge converter. The number of phases of the fuel cell converter 11 is not limited to four, but may be one, two, or three, or may be four or more.

E6. Modification 6: The voltage control system of each of the above embodiments is incorporated in the fuel cell system provided in the fuel cell vehicle. In this regard, the voltage control system of each of the above embodiments may be incorporated in a fuel cell system provided in a movable body other than the fuel cell vehicle, or may be incorporated in a fuel cell system fixedly provided in a building, a facility, or the like. Further, the voltage control system of each of the above embodiments may not be incorporated in the fuel cell system, but may be incorporated in a power generating system including a wind turbine generator, for example.

The present disclosure is not limited to the above embodiments, examples, and modifications, and is achievable in various configurations within a range that does not deviate from the gist of the present disclosure. For example, technical features of the embodiments, the examples, and the modifications, which correspond to the technical features of the aspects described in SUMMARY can be replaced or combined appropriately, in order to resolve some or all of the problems described above or in order to achieve some or all of the above effects. Further, the technical features can be deleted appropriately if the technical features have not been described as essential in the present specification.

What is claimed is:

1. A voltage control system that increases an input voltage, the voltage control system comprising:

a converter device including a reactor and a switching element, the reactor being configured to perform accumulation and release of electrical energy in one cycle, and to be controlled by a duty ratio determined as a ratio of an accumulation period during which the energy is input and accumulated into the reactor in the one cycle;
a current sensor configured to acquire a current measured value, the current measured value being an output current found as a time average of a current value output from the reactor in the one cycle;
a voltage sensor configured to acquire an input side voltage value indicative of an input voltage of the converter device and an output side voltage value indicative of an output voltage of the converter device; and
a converter controller configured to set the duty ratio and control an output voltage of the converter device in a present cycle based on adding an addition term to a feedforward term, wherein:
the converter controller is configured to derive the feedforward term based on the input side voltage value and the output side voltage value acquired at a beginning of the present cycle,
the converter controller is configured to derive the addition term corresponding to an increase of the output current in the present cycle, based on at least one of a current deviation between a target value of the output current and the current measured value in a previous cycle, and the duty ratio in the previous cycle, and
the addition term is expressed by Expression (1):

$$\Delta D = \frac{V_L}{V_H}\left(1 - \sqrt{1 - \frac{V_H}{V_L} \cdot Dp \cdot \frac{\Delta I}{I - I_0}}\right) \quad (1)$$

where $\Delta D$ indicates the addition term, $V_L$ indicates the input side voltage value, $V_H$ indicates the output side voltage value, $Dp$ indicates the duty ratio in the previous cycle, $\Delta I$ indicates the current deviation, $I$ indicates the current measured value in the previous cycle, and $I_0$ indicates the current value output from the reactor at a beginning of the previous cycle.

2. The voltage control system according to claim 1, wherein the value of the addition term corresponds to an increasing amount of the duty ratio, and
the converter controller is configured to increase the duty ratio by the increasing amount to increase the current measured valued from the previous cycle only by an amount corresponding to the current deviation if the addition term is added to the duty ratio in the previous cycle.

3. The voltage control system according to claim 1, wherein the converter controller is configured to derive the addition term by use of the current deviation and at least one of the target value of the output current in the present cycle, the current measured value in the previous cycle, the duty ratio in the previous cycle, and the input side voltage value in the present cycle.

4. A voltage control system that increases an input voltage, the voltage control system comprising:
a converter device including a reactor and a switching element, the reactor being configured to perform accumulation and release of electrical energy in one cycle, and to be controlled by a duty ratio determined as a ratio of an accumulation period during which the energy is input and accumulated into the reactor in the one cycle;
a current sensor configured to acquire a current measured value, the current measured value being an output current found as a time average of a current value output from the reactor in the one cycle;
a voltage sensor configured to acquire an input side voltage value indicative of an input voltage of the converter device and an output side voltage value indicative of an output voltage of the converter device; and
a converter controller configured to set the duty ratio and control an output voltage of the converter device in a present cycle based on adding an addition term to a feedforward term, wherein:
the converter controller is configured to derive the feedforward term based on the input side voltage value and the output side voltage value acquired at a beginning of the present cycle,
the converter controller is configured to derive the addition term corresponding to an increase of the output current in the present cycle, based on at least one of a current deviation between a target value of the output current and the current measured value in a previous cycle, and the duty ratio in the previous cycle, and
the addition term is expressed by Expression (2):

$$\Delta D = \frac{V_L}{V_H} \cdot \left(1 - \sqrt{1 - 2 \cdot \frac{V_H \cdot L}{V_L^2 \cdot T} \cdot \Delta I}\right) \quad (2)$$

where $\Delta D$ indicates the addition term, $V_L$ indicates the input side voltage value, $V_H$ indicates the output side voltage value, $L$ indicates an inductance of the reactor, $T$ indicates a period of the one cycle, and $\Delta I$ indicates the current deviation.

5. A voltage control system that increases an input voltage, the voltage control system comprising:
a converter device including a reactor and a switching element, the reactor being configured to perform accumulation and release of electrical energy in one cycle, and to be controlled by a duty ratio determined as a ratio of an accumulation period during which the energy is input and accumulated into the reactor in the one cycle;
a current sensor configured to acquire a current measured value, the current measured value being an output current found as a time average of a current value output from the reactor in the one cycle;
a voltage sensor configured to acquire an input side voltage value indicative of an input voltage of the converter device and an output side voltage value indicative of an output voltage of the converter device; and
a converter controller configured to set the duty ratio and control an output voltage of the converter device in a present cycle based on adding an addition term to a feedforward term, wherein:
the converter controller is configured to derive the feedforward term based on the input side voltage value and the output side voltage value acquired at a beginning of the present cycle, the converter controller is configured to derive the addition term corresponding to an increase of the output current in the present cycle, based on at least one of a current deviation between a target value of the output current and the current measured value in a previous cycle, and the duty ratio in the previous cycle, and
the addition term is expressed by Expression (3):

$$\Delta D = \frac{L}{V_L \cdot T} \cdot \Delta I \tag{3}$$

where $\Delta D$ indicates the addition term, $V_L$ indicates the input side voltage value, L indicates an inductance of the reactor, $\Delta I$ indicates the current deviation, and T indicates a period of the one cycle.

6. A voltage control system that increases an input voltage, the voltage control system comprising:
a converter device including a reactor and a switching element, the reactor being configured to perform accumulation and release of electrical energy in one cycle, and to be controlled by a duty ratio determined as a ratio of an accumulation period during which the energy is input and accumulated into the reactor in the one cycle;
a current sensor configured to acquire a current measured value, the current measured value being an output current found as a time average of a current value output from the reactor in the one cycle;
a voltage sensor configured to acquire an input side voltage value indicative of an input voltage of the converter device and an output side voltage value indicative of an output voltage of the converter device; and
a converter controller configured to set the duty ratio and control an output voltage of the converter device in a present cycle based on adding an addition term to a feedforward term, wherein:
the converter controller is configured to derive the feedforward term based on the input side voltage value and the output side voltage value acquired at a beginning of the present cycle,
the converter controller is configured to derive the addition term corresponding to an increase of the output current in the present cycle, based on at least one of a current deviation between a target value of the output current and the current measured value in a previous cycle, and the duty ratio in the previous cycle, and
the addition term is expressed by Expression (4):

$$\Delta D = \frac{1}{2} \cdot Dp \cdot \frac{\Delta I}{I - I_0} \tag{4}$$

where $\Delta D$ indicates the addition term, Dp indicates the duty ratio in the previous cycle, $\Delta I$ indicates the current deviation, I indicates the current measured value in the previous cycle, and $I_0$ indicates the current value output from the reactor at a beginning of the previous cycle.

7. The voltage control system according to claim 1, wherein the converter controller is configured to set the duty ratio based on the addition term in response to the current deviation being a predetermined threshold or more.

8. The voltage control system according to claim 7, wherein the converter controller is configured to set another duty ratio by use of at least the feedforward term and a feedback term to be added to the feedforward term, wherein the feedback term changes relative to the changes of the current deviation less than the addition term.

9. The voltage control system according to claim 1, wherein the converter controller is configured to set the duty ratio in the present cycle using the feedforward term, the addition term, and a feedback term, the feedback term being a component to eliminate the current deviation and is different from the addition term.

10. A fuel cell system comprising:
a fuel cell; and
a voltage control system according to claim 1, wherein the voltage control system is configured to increase a voltage output from the fuel cell as the input voltage.

11. The voltage control system according to claim 1, wherein the converter device comprises a four-phase bridge converter.

12. The fuel cell system according to claim 11, wherein the voltage control system comprises a four-phase bridge converter.

* * * * *